UNITED STATES PATENT OFFICE.

WILLIAM SÄNGER, OF PASSAIC, NEW JERSEY, ASSIGNOR, BY MESNE ASSIGNMENTS, TO ASBESTOS SLATE ROOFING MANUFACTURING COMPANY, INCORPORATED.

ARTIFICIAL-STONE SLAB, SHINGLE, AND PLATE AND COMPOSITION FOR MAKING SAME.

1,223,834.     Specification of Letters Patent.     Patented Apr. 24, 1917.

No Drawing.     Application filed August 30, 1915. Serial No. 48,072.

*To all whom it may concern:*

Be it known that I, WILLIAM SÄNGER, a citizen of the German Empire, and a resident of Passaic, in the county of Passaic and State of New Jersey, have invented certain new and useful Improvements in Artificial-Stone Slabs, Shingles, and Plates and Composition for Making Same, of which the following is a specification.

This invention has reference to a novel process of making artificial stone slabs, shingles, plates and the like. It pertains particularly to a novel process of producing slabs and shingles for roofing purposes of a composition consisting essentially of asbestos fiber, hydraulic binding cement and anhydrous silica or as it is scientifically called silicon dioxid or silicium dioxid, and some water.

Heretofore compositions of this kind have been prepared from asbestos fiber and cements with additions of special waterproofing compositions or substances which unnecessarily increase the cost of production. Another composition contains fine quartz powder to increase the binding power of basic silicates of lime by subjecting the mass to the action of steam. Further sodium silicate has been treated with nitric acid to produce partly sodium nitrate and hydrated silica which is mixed with Portland cement, etc. The sodium nitrate certainly is useless in an artificial stone product. Other compositions result in artificial stone products which suffer from the defect of efflorescence. If the mixture contains calcium oxid and magnesium oxid then the finished product blossoms out under atmospheric influences. For instance $$Ca(OH)_2 + CO_2 = CaCO_3 + H_2O$$

whereby efflorescence is produced. Another composition speaks of colloidal cement. This expression appears not to be appropriate for a cement or similar mineral substance of composite character. Such composite materials can not be brought into a colloidal condition like gums, starch, gelatin or the ductile precious metals, since they never will be glue- or jelly-like because their composite character implies different specific gravities. Composite substances are not uniform as to physical condition and, accordingly can not acquire the state of being perfectly colloidal like gelatin or ductile like the precious metals. For these reasons cement can only be kept in suspension by great bulks of water for a limited period of time as the specifically heavier components act differently from the lighter ones. Great bulks of water make the production of an article tedious and increase the cost unnecessarily.

It is the special purpose of the present invention to avoid the described defects and to produce artificial stone, slabs, shingles, or plates by means of a very simple and inexpensive process which also results in a superior article. This has been primarily attained by preparing a composition of hydraulic binding cement, asbestos fiber and anhydrous silica. The addition of anhydrous silica, 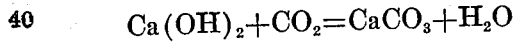 $SiO_2$, presents various advantages. It prevents efflorescence because it combines into calcium silicate or magnesium silicate with compounds like CaO and MgO nearly always present in any cementitious matter and which are acted upon by the atmospheric carbonic acid gas $CO_2$ under the formation of calcium carbonate or magnesium carbonate. These latter ingredients particularly have a very detrimental effect upon pressed cementitious materials inasmuch as they cause cracks within the finished goods and also decrease their tensile strength to a very high degree. The precipitated silica preferably employed therefore imparts a uniform character to the mass and gives the finished product the necessary elasticity at an increased tensile strength. The action of atmospheric water upon the finished articles will have no detrimental effect whatever upon them, but on the contrary the uncombined silica in the presence of water will further combine with the bases mentioned above while the simpler silicates may be transformed into more complicated silica compounds thus causing a further silification. The anhydrous silica remains in the finished shingles unchanged throughout except at the surface where a subsequent exposure to the atmosphere partly produces a silification of the surface portion.

The silica outside is only temporarily hydrated because it combines with lime and forms the insoluble calcium silicate.

The invention is carried into effect in substantially the following manner:

An intimate mixture is prepared of hydraulic binding cement, asbestos and anhydrous silica with a small quantity of water. The plastic mass obtained is then put into molds adapted to give the finished article the desired shape. In case of shingles I prefer to produce them each with a rectangular and a slanting longitudinal surface for the purpose of producing what the architects call a shadow line effect on the roof and to facilitate the laying. The mass, while in the hermetically sealed mold, is subjected to the pressure of compressed air. The shingles thus dehydrated and molded are subsequently subjected to high pressure, hydraulic pressure if desired and then the highly pressed article is treated with steam to effect the silification in the surface portion which finally results in the formation of silicate of calcium by combining with the lime of the cement.

The addition of anhydrous silica also presents the advantage of binding caustic bases such as lime which may occur in the cement or the mass. This in turn results in a better hardening of the product and increased tensile strength and the properties of being water and fire proof are also increased.

The proportions in which the various components are admixed may vary within reasonable limits especially on account of variations in the compositions of the cements. One formula which gives good results for most products is substantially as follows:

About 80 parts of cement are mixed with 15 parts of finely disintegrated asbestos and about 5 parts of anhydrous silica. A plastic mass is prepared from this dry mixture with only about twice its weight of water. The plastic mass is then worked up into shingles, plates, or slabs etc. in the manner herein described.

I claim as my invention:

1. A composition of matter for producing artificial stone slabs, shingles, plates and the like consisting of cement, asbestos fiber, chemically active precipitated anhydrous silica, and water, the said silica being adapted to effect the silification of the bases contained in the cement.

2. A composition of matter for producing artificial stone, slabs, shingles, plates and the like consisting of cement, finely divided asbestos fiber, chemically active precipitated anhydrous silica, and water, the said silica being adapted to effect the silification of the bases contained in the cement and to increase the strength and hardness of the composition in the course of time by forming insoluble silicate under the influence of atmospheric moisture and carbonic acid gas.

3. A composition of matter for producing artificial stone slabs, shingles, plates and the like consisting of cement, fine asbestos fiber, chemically active precipitated anhydrous silica and about twice the weight of the dry mass of water, the said silica being adapted to effect the silification of the bases of the cement.

4. A composition of matter for producing artificial stone slabs, shingles, plates and the like consisting of cement, fine asbestos fiber, chemically active precipitated anhydrous silica and about twice the weight of the dry mass of water, the said silica being adapted to effect the silification of the bases of the cement throughout the composition and of its surface portion by steam.

5. A composition of matter for producing artificial stone slabs, shingles, plates and the like consisting of hydraulic binding cement, fine asbestos fiber, chemically active precipitated anhydrous silica, and water, the said silica and free earthy basic oxids occurring in the surface portion of the composition being adapted to be hydrated by steam and to form insoluble earthy silicates from the hydrated substances.

6. A composition of matter for producing artificial stone articles consisting of about 80 parts of hydraulic binding cement, about 15 parts of finely divided asbestos fiber, about 5 parts of chemically active precipitated anhydrous silica, and about twice the weight of the dry mass of water, the said silica being adapted to effect the hydration of the silica and basic earthy oxids of the surface portion and to form insoluble earthy silicate.

7. As a novel product of manufacture an artificial stone article composed of hydraulic binding cement, fine asbestos fiber, precipitated anhydrous silica, and in which insoluble silicates of the earthy alkaline bases are produced in the surface portion when exposed to atmospheric moisture and carbonic acid gas.

8. As a novel product of manufacture an artificial stone article comprising about 80 parts of hydraulic binding cement, about 15 parts of finely divided asbestos fiber, about 5 parts of precipitated anhydrous silica, and in which insoluble silicates of the earthy alkaline bases are produced in the surface portion when exposed to the action of atmospheric moisture and carbonic acid gas.

Signed at New York, N. Y., this 24th day of August, 1915.

WILLIAM SÄNGER.

Witnesses:
HERMAN J. RUBENSTEIN,
LILLEY E. SCHMIDT.